(12) United States Patent
Brown et al.

(10) Patent No.: US 8,331,381 B2
(45) Date of Patent: *Dec. 11, 2012

(54) PROVIDING VISIBILITY OF ETHERNET COMPONENTS TO A SUBNET MANAGER IN A CONVERGED INFINIBAND OVER ETHERNET NETWORK

(75) Inventors: Aaron C. Brown, Austin, TX (US); Jimmy R. Hill, Austin, TX (US); Gregory F. Pfister, Austin, TX (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/949,823

(22) Filed: Dec. 4, 2007

(65) Prior Publication Data

US 2009/0141728 A1     Jun. 4, 2009

(51) Int. Cl.
*H04L 12/28* (2006.01)
(52) U.S. Cl. ...................................................... 370/401
(58) Field of Classification Search .................. 370/401
See application file for complete search history.

(56) References Cited

U.S. PATENT DOCUMENTS

| 2002/0156888 | A1* | 10/2002 | Lee et al. ...................... 709/224 |
| 2003/0084219 | A1* | 5/2003 | Yao et al. ...................... 710/300 |
| 2004/0213220 | A1* | 10/2004 | Davis ............................ 370/389 |
| 2009/0141734 | A1* | 6/2009 | Brown et al. .................. 370/419 |

OTHER PUBLICATIONS

On the InfiniBand Subnet Discovery Process—IEEE Cluster'03 to Bermudez et al.*
"On the InfiniBand Subnet Discovery Process—IEEE Cluster'03 " to Bermudez et al.*

* cited by examiner

*Primary Examiner* — Ayaz Sheikh
*Assistant Examiner* — Hai-Chang Hsiung
(74) *Attorney, Agent, or Firm* — Yudell Isidore Ng Russell PLLC

(57) ABSTRACT

A method of providing visibility of Ethernet components to a subnet manager in a converged InfiniBand over Ethernet (IBOE) network. If a port of an IBOE gateway corresponds to one or more InfiniBand devices, the subnet manager sends fabric management packets (FMPs) to discover the InfiniBand network and assigns physical local identifiers (LIDs) to the InfiniBand devices. If a port of the IBOE gateway corresponds to one or more Ethernet devices, the subnet manager sends FMPs to discover the Ethernet network. The subnet manager adds the Ethernet Media Access Control (MAC) addresses of any responding devices to an LID routing table and assigns LIDs to the Ethernet devices. The subnet manager configures one or more virtual Host Channel Adapters (HCAs) corresponding to the one or more Ethernet MAC addresses in the LID routing table.

20 Claims, 4 Drawing Sheets

| 220 | 205 | 210 | 215 |
|---|---|---|---|
| Not LID Mapped | MAC Address 1 | InfiniBand LID 1 | IBOE Port Number 1 |
| LID Mapped | 0 | InfiniBand LID 2 | IBOE Port Number 2 |
| ⋮ | ⋮ | ⋮ | ⋮ |
| Not LID Mapped | MAC Address M | InfiniBand LID N | IBOE Port Number X |

FIG. 2

PROVIDING VISIBILITY OF ETHERNET COMPONENTS TO A SUBNET MANAGER IN A CONVERGED INFINIBAND OVER ETHERNET NETWORK

BACKGROUND OF THE INVENTION

1. Technical Field

The present invention relates in general to computer servers and in particular to computer networking protocols. Still more particularly, the present invention relates to an improved method and system for providing visibility of Ethernet components to a subnet manager in a converged InfiniBand over Ethernet network.

2. Description of the Related Art

InfiniBand is a switched fabric computer network communications link that includes connections between multiple processor nodes and high performance Input/Output (I/O) nodes. InfiniBand provides a point-to-point bidirectional serial link between processors and high performance peripheral devices (e.g., data storage units). In an InfiniBand network, a subnet manager is typically responsible for discovering networked components and assigning local identifiers (LIDs) to each component. The subnet manager sends source-routed packets referred to as fabric management packets (FMPs) to discover components in the InfiniBand network. Each FMP includes a hop field that defines the target of the FMP. For example, if the hop field is a zero value, then the currently active component is the target. However if the hop field is a non-zero value, then the subnet manager decrements the hop field and uses the next port number in a port number array to select the outbound port of a network switch.

Ethernet is a family of frame-based computer networking technologies that operates at multiple signaling rates. Ethernet is typically used in Local Area Networks (LANs). The Ethernet protocol, which is also referred to as the Institute of Electrical and Electronics Engineers (IEEE) 802.3 standard, defines wiring and signaling standards for physical LAN layers, including a means of network access at the Media Access Control (MAC) sub layer and a common address format. Ethernet stations communicate by sending small blocks of data, referred to as data packets, between nodes and/or infrastructure devices (e.g., hubs, switches, and routers) over various types of copper twisted pair wiring and/or fiber optic cable. Each Ethernet station includes a single 48-bit MAC address that may be used to specify the destination or source of a data packet.

Conventional heterogeneous server and storage networks support multiple network protocols simultaneously, such as Ethernet and InfiniBand. As the number of protocols supported by a heterogeneous network increases, so does the complexity of the network infrastructure. Specifically, the Ethernet protocol does not support FMPs, which are used by subnet managers to discover InfiniBand components. The lack of support for FMPs in Ethernet networks can thus be problematic in converged InfiniBand over Ethernet networks.

SUMMARY OF AN EMBODIMENT

Disclosed are a method, system, and computer program product for providing visibility of Ethernet components to a subnet manager in a converged InfiniBand over Ethernet (IBOE) network. If a port of an IBOE gateway corresponds to one or more InfiniBand devices, the subnet manager sends fabric management packets (FMPs) to discover the InfiniBand network and assigns physical local identifiers (LIDs) to the InfiniBand devices. If a port of the IBOE gateway corresponds to one or more Ethernet devices, the subnet manager sends FMPs to discover the Ethernet network. The subnet manager adds the Ethernet Media Access Control (MAC) addresses of any responding devices to an LID routing table and assigns LIDs to the Ethernet devices. The subnet manager configures one or more virtual Host Channel Adapters (HCAs) corresponding to the one or more Ethernet MAC addresses in the LID routing table.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 illustrates an exemplary InfiniBand Local Identifier (LID) routing table, according to an embodiment of the present invention.

DETAILED DESCRIPTION OF AN ILLUSTRATIVE EMBODIMENT

The present invention provides a method, system, and computer program product for providing visibility of Ethernet components to a subnet manager in a converged InfiniBand over Ethernet network.

Figure 1A:
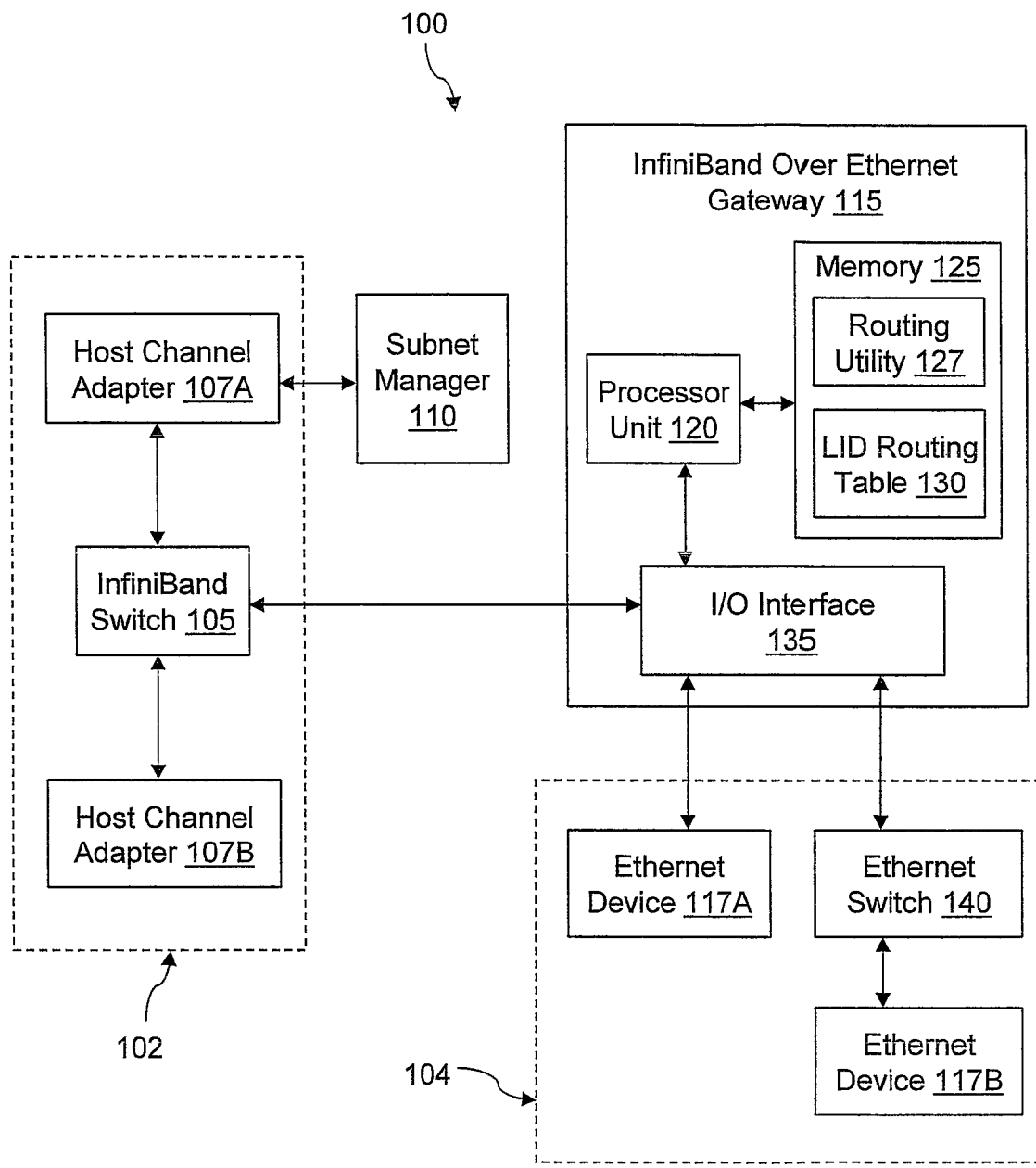
FIG. 1A depicts a high level block diagram of an exemplary network, according to an embodiment of the present invention.
Figure 3:
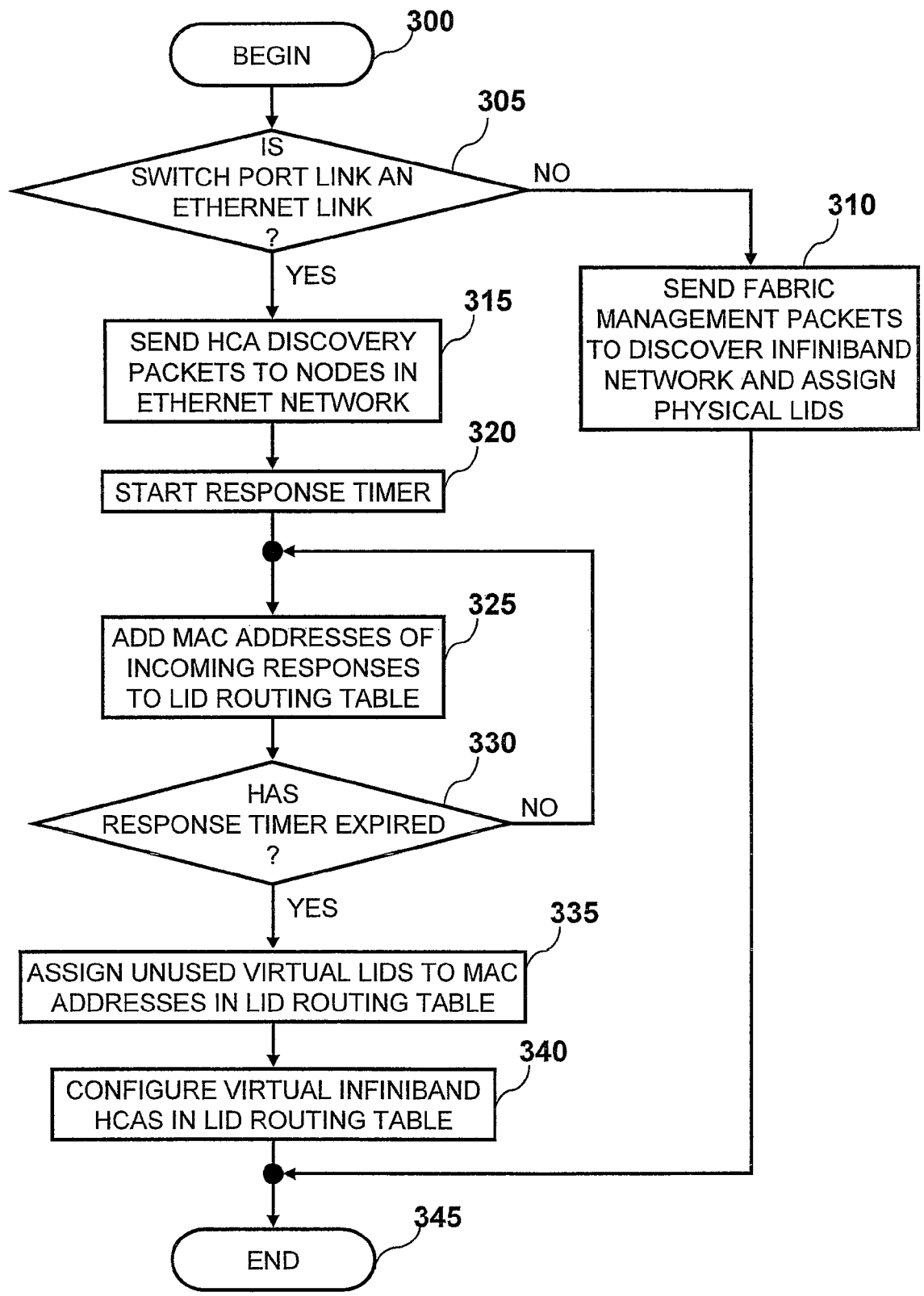
FIG. 3 is a high level logical flowchart of an exemplary method of providing visibility of Ethernet components to a subnet manager in a converged InfiniBand over Ethernet network, according to an embodiment of the invention.

With reference now to FIG. 1A, there is depicted a high level block diagram of an exemplary network, according to an embodiment of the present invention. As shown, network 100 includes InfiniBand fabric 102, Ethernet fabric 104, subnet manager 110, and InfiniBand over Ethernet (IBOE) gateway 115. IBOE gateway 115, which is connected to both InfiniBand fabric 102 (via I/O Interface 135) and Ethernet fabric 104, sends and receives InfiniBand data packets over Ethernet fabric 104. InfiniBand fabric 102 includes InfiniBand switch 105 and multiple host channel adapters (HCAs) 107A and 107B, which are coupled to InfiniBand switch 105, and Subnet Manager 110, which can reside above one or more InfiniBand HCAs, such as HCA 107A. Similarly, Ethernet fabric 104 includes a first Ethernet device 117A that is coupled directly to IBOE gateway 115 and a second Ethernet device 117B that is coupled to Ethernet switch 140. Ethernet switch 140 is in turn coupled to IBOE gateway 115. Ethernet devices 117A and 117B are defined by unique Ethernet Media Access Control (MAC) addresses, and Ethernet devices 117A and 117B may include virtual InfiniBand HCAs that enables subnet manager 110 to provide visibility of Ethernet devices 117A and 117B, as illustrated in FIG. 3, which is described below.

In one embodiment, IBOE gateway 115 includes processor unit 120, memory 125, and Input/Output (I/O) interface 135. I/O interface 135 is coupled to processor unit 120. Memory 125, which is also coupled to processor unit 120, includes routing utility 127 and local identifier (LID) routing table 130. LID routing table 130 includes network address information corresponding to one or more virtual InfiniBand LIDs, real (i.e., physical) InfiniBand LIDs, and Ethernet MAC addresses. An exemplary LID routing table 130 is illustrated in FIG. 2, which is described below. Routing utility 127 performs the functions illustrated in FIG. 3, which is described below.

According to the illustrative embodiment, subnet manager 110 is connected to the InfiniBand fabric 102 through one or more InfiniBand HCAs. Subnet manager 110 discovers (i.e., locates and identifies) one or more devices in InfiniBand fabric 102 (e.g., HCAs 107A and 107B) by sending Fabric Management Packets (FMPs) to InfiniBand fabric 102. Three InfiniBand over Ethernet (IBoE) gateway fabric management packets (FMPs) are used by subnet manager 110 to discover and configure IBoE gateway 115. The IB encapsulated IBoE Discover Virtual HCA Ethernet multicast management packet is sent to the I/O interface 135 LID and the routing utility extracts the Ethernet multicast packet and sends the IBoE Discover Virtual HCA Ethernet multicast packet on the Ethernet fabric as described in FIG. 3. The IB encapsulated IBoE Virtual HCA Response management response packet is sent from all Virtual HCAs residing on the Ethernet fabric to the I/O interface 135 and the I/O interface 135 encapsulates this packet as an IB encapsulated IBoE Discover Virtual HCA Ethernet response management packet, which is sent to subnet manager 110 as described in FIG. 3. The IB Set routing table packet is sent from subnet manager 110 to the I/O interface 135 and contains the routing table described in FIG. 2. Additional management packets can be used to only add elements to the routing table, to query the routing table or clear the routing table.

Routing utility 127 uses LID routing table 130 in IBOE gateway 115 to store the routing table described in FIG. 2, which contains a list of the Virtual HCAs resident in Ethernet fabric 104. Subnet manager 110 assigns a LID to each Virtual HCA that responds IBoE Discover Virtual HCA Ethernet multicast packet with a IB encapsulated IBoE Virtual HCA Response management response packet. In Ethernet fabric 104, Ethernet device 117A receives the IBoE Discover Virtual HCA Ethernet multicast packet and respond with a IB encapsulated IBoE Virtual HCA Response management response packet containing its MAC Address. Similarly, Ethernet devices 117B receives the IBoE Discover Virtual HCA Ethernet multicast packet and respond with a IB encapsulated IBoE Virtual HCA Response management response packet containing its MAC Address.

When subnet manager 110 issues FMPs to devices on the other side of IBOE gateway 115 with respect to subnet manager 110, IBOE gateway 115 appears as a single switch with a large port count from the perspective of subnet manager 110, regardless of whether devices are directly coupled to IBOE gateway 115 (e.g., Ethernet device 117A) or connected to IBOE gateway through an Ethernet network or Ethernet switch (e.g., Ethernet device 117B). Therefore, all Ethernet devices that are virtually visible to subnet manager 110 via IBOE gateway 115 appear as if the Ethernet devices are directly coupled to IBOE gateway 115, and subnet manager 110 may thus assign LIDs to the Ethernet devices within LID routing table 130.

In an alternate embodiment, Ethernet fabric 104 may include an Ethernet network with one or more Ethernet switches. In another alternate embodiment, Ethernet fabric 104 may use Ethernet links that have been enhanced to support convergence with cluster and storage traffic, such as a Convergence Enhanced Ethernet (CEE). Similarly, InfiniBand fabric 102 may include an InfiniBand network with additional switches and HCAs.

Figure 1B:
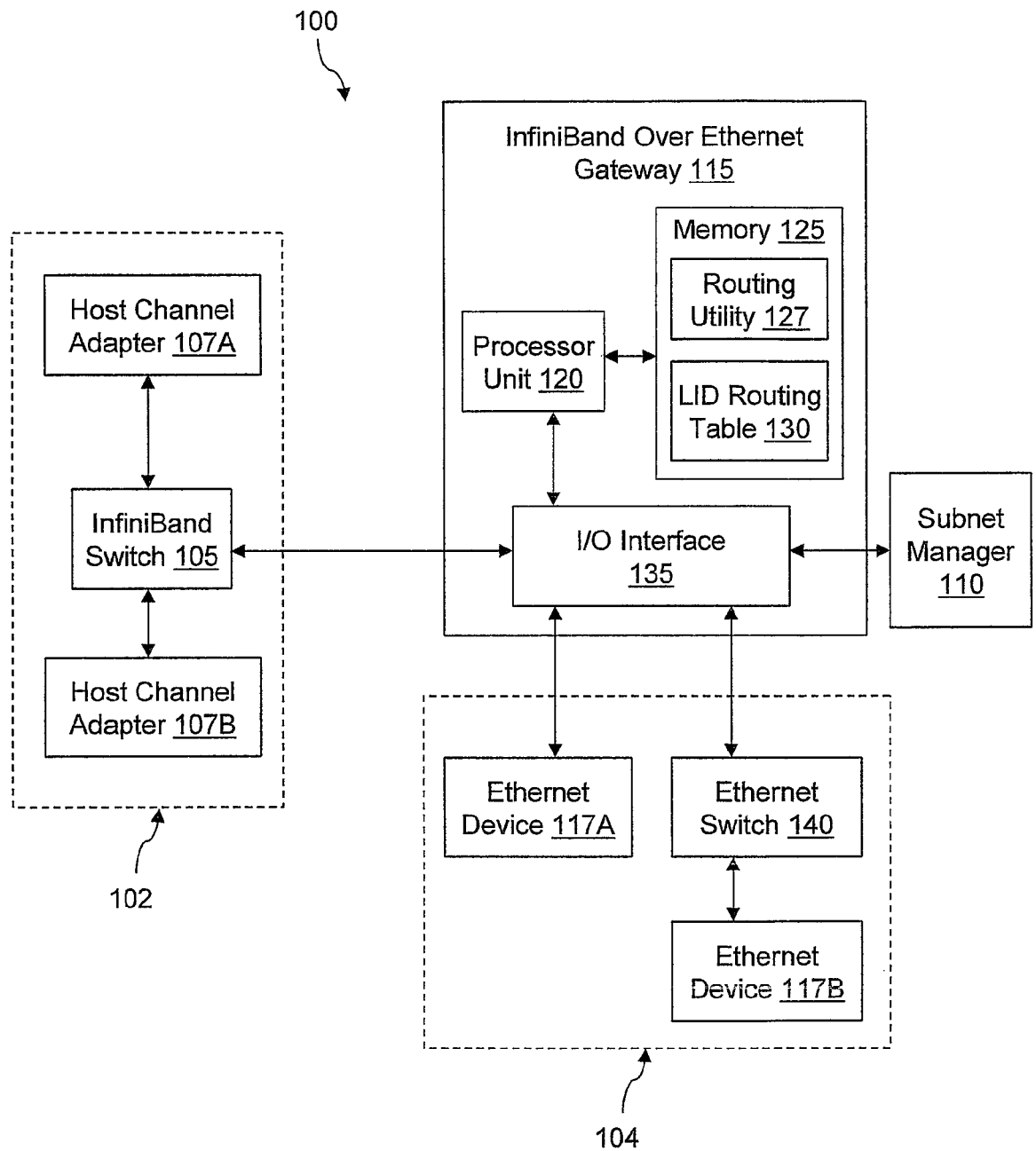
FIG. 1B depicts a high level block diagram of an alternate configuration of the exemplary network of FIG. 1A, according to another embodiment of the present invention.

With reference now to FIG. 1B, there is depicted a high level block diagram of an alternate configuration of network 100, according to another embodiment of the present invention. According to the embodiment of FIG. 1B, subnet manager 110 is attached through the I/O Interface 135 and subnet manager 110 is connected to the InfiniBand fabric through I/O Interface 135. In another embodiment, subnet manager 110 may instead be connected to the InfiniBand fabric through InfiniBand switch 105. Subnet manager 110 discovers (i.e., locates and identifies) one or more devices in InfiniBand fabric 102 (e.g., HCAs 107A and 107B) by sending Fabric Management Packets (FMPs) to InfiniBand fabric 102 as described in the InfiniBand Volume 1 Specification.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2, there is depicted an exemplary InfiniBand LID routing table, according to an embodiment of the present invention. As shown, LID routing table 130 (FIG. 1A) includes multiple rows 200. LID routing table includes M Ethernet Media Access Control (MAC) addresses 205 that correspond to the addresses of Ethernet devices (e.g., Ethernet device 117A) or computers within Ethernet fabric 104, where M is a positive integer. Similarly, LID routing table 130 also includes N InfiniBand LIDs 210 that correspond to HCAs (e.g., HCA 107A) or computers within InfiniBand fabric 102, where N is a positive integer. LID routing table 130 also includes X IBOE port numbers 215 that correspond to ports of IBOE gateway 115 that devices are coupled to for communication purposes, where X is a positive integer. LID routing table 130 thus includes M Ethernet MAC addresses 205 matched to N InfiniBand LIDs 210 and X IBOE port numbers 215. LID routing table 130 also includes multiple LID mapping bits 220. Virtual HCAs (i.e., HCAs attached through an Ethernet fabric) contain a MAC address in table 130. Physical HCAs (i.e., HCAs attached directly to an IB fabric) contain a zero in place of the MAC address in table 130.

If an Ethernet device (e.g., Ethernet device 117B) within Ethernet fabric 104 is LID mapped, then the entry (i.e., row) within LID routing table 130 that corresponds to the device includes a virtual InfiniBand LID 210, a corresponding IBOE port number 215 and a LID Mapped MAC Address. A LID Mapped MAC Address is one where the upper 24 bits of the MAC Address are the OUI-24 number assigned to IB LID Mapped MAC addresses, the next 8 bits are zeros and the last 16 bits are the subnet manager 110 assigned LIDs.

If an Ethernet device (e.g., Ethernet device 117A) within Ethernet fabric 104 is not LID mapped, the entry within LID routing table 130 includes the Ethernet MAC address 205 that the virtual HCA MAC Address used in the IBoE Virtual HCA Response management response packet, as well as a virtual InfiniBand LID 210 and IBOE port number 215.

In an alternate embodiment, for an Ethernet device (e.g., Ethernet device 117B) within Ethernet fabric 104 is LID mapped, the Ethernet Address 205 may include a placeholder value (e.g., zero) if an Ethernet device is LID mapped. In another embodiment, table 130 contains only one type of MAC addresses.

In one embodiment, LIDs 210 may refer to physical HCAs (i.e., HCAs attached directly to the InfiniBand fabric) or virtual HCAs (i.e., HCAs attached to an Ethernet fabric). Both types of HCAs use LIDs assigned by Subnet Manager 110. However, virtual HCAs encapsulate IB packets within an Ethernet packet using the MAC mapping mechanism described in the IBoE Discover Virtual HCA Ethernet multicast packet sent by subnet manager 110.

Turning now to FIG. 3, there is illustrated a high level logical flowchart of an exemplary method of providing visibility of Ethernet components to a subnet manager in a converged InfiniBand over Ethernet network, according to an embodiment of the invention. The process begins at block 300. At block 305, subnet manager 110 (FIGS. 1A-1B) determines whether or not a link on a switch port of IBOE gateway 115 (FIGS. 1A-1B) corresponds to an Ethernet link (i.e., whether or not a port corresponds to one or more Ethernet devices). If a switch port link of IBOE gateway 115 does not correspond to an Ethernet link (i.e., the port corresponds to one or more InfiniBand devices), subnet manager 110 sends FMPs to one or more HCAs, switches, and/or other InfiniBand devices in InfiniBand fabric 102 to discover the devices, and subnet manager 110 assigns physical InfiniBand LIDs 210 to the discovered InfiniBand channel adapters, as depicted in block 310. The process subsequently terminates at block 345.

If a switch port link of IBOE gateway 115 corresponds to an Ethernet link (i.e., the port corresponds to one or more Ethernet devices), subnet manager 110 sends one or more IBoE Discover Virtual HCA Ethernet multicast packet, which is received by each node, computer, and/or Ethernet device in Ethernet fabric 104 that contains a virtual HCA, as depicted in block 315. Subnet manager 110 initializes a temporary response timer by clearing a counter variable and starting the response timer (i.e., periodically incrementing the counter variable), as shown in block 320. Subnet manager 110 adds Ethernet MAC addresses 205 (FIG. 2) that correspond to one or more incoming responses received from the nodes in Ethernet fabric 104 to LID routing table 130, as depicted in block 325.

At block 330, subnet manager 110 determines whether or not the response timer has expired (i.e., whether the counter has reached a pre-defined expiration value). If the response timer has not expired, the process returns to block 325. Once the response timer has expired, subnet manager 110 may assign unused (i.e., open) InfiniBand LIDs 210 (FIG. 2) to Ethernet MAC addresses 205 in LID routing table 130, as shown in block 335. Subnet manager 110 may configure virtual InfiniBand HCAs for one or more nodes (e.g., Ethernet device 117A) within LID routing table 130, as depicted in block 340, and the process terminates at block 345.

The present invention thus provides a method of providing visibility of Ethernet components to a subnet manager in a converged InfiniBand over Ethernet network. IBOE gateway 115 provides subnet manager 110 with a virtual view of Ethernet fabric 104, thereby enabling subnet manager 110 to send IBoE FMPs and assign LIDs to Ethernet devices that do not otherwise support FMPs. If a port of IBOE gateway 115 corresponds to one or more InfiniBand devices, subnet manager 110 sends FMPs to discover InfiniBand fabric 102 and assigns physical LIDs to the InfiniBand devices. If a port of IBOE gateway 115 corresponds to one or more Ethernet devices, subnet manager 110 sends FMPs to discover Ethernet fabric 104. Subnet manager 110 adds the Ethernet MAC addresses of any responding devices to LID routing table 130 and assigns LIDs to the Ethernet devices. Subnet manager 110 configures one or more virtual HCAs corresponding to the one or more Ethernet MAC addresses in LID routing table 130.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer network with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer network, a method comprising:
   a subnet manager coupled to an InfiniBand over Ethernet (IBOE) gateway in a network determining if a port of said IBOE gateway corresponds to one of one or more InfiniBand devices in an InfiniBand network or one or more Ethernet devices in an Ethernet network;
   in response to a determination that the port of said IBOE gateway corresponds to one or more InfiniBand devices in an InfiniBand network:
      sending one or more fabric management packets (FMPs) to said one or more InfiniBand devices to discover said InfiniBand network; and
      assigning physical local identifiers (LIDs) to said one or more InfiniBand devices; and
   in response to a determination that the port of said IBOE gateway corresponds to one or more Ethernet devices in an Ethernet network:
      sending one or more FMPs to said one or more Ethernet devices to discover said Ethernet network;
      receiving a response from one or more responding Ethernet devices of said one or more Ethernet devices, wherein said response is an InfiniBand encapsulated IBOE Virtual Host Channel Adapters (HCA) response management packet from a virtual HCA that contains an Ethernet Media Access Control (MAC) address of the virtual HCA;
      adding one or more Ethernet MAC addresses of said one or more responding Ethernet devices to a LID routing table, wherein the LID routing table includes:
         one or more Ethernet MAC addresses that correspond to said one or more Ethernet devices;

one or more InfiniBand LIDs that correspond to one or more physical HCAs, wherein physical HCAs in the LID routing table contain a zero in place of the MAC address;
one or more IBOE port numbers that correspond to ports of the IBOE gateway that one or more devices are coupled to;
one or more Ethernet MAC addresses matched to InfiniBand LIDs and IBOE port numbers; and
one or more LID mapping bits;
wherein virtual HCAs in the LID routing table contain a MAC address;
assigning one or more LIDs to said one or more Ethernet devices; and
configuring one or more virtual HCAs corresponding to said one or more Ethernet MAC addresses in said LID routing table.

2. The method of claim 1, wherein the IBOE gateway has a first port connected to said one or more InfiniBand devices in said InfiniBand network and a second port connected to said one or more Ethernet devices in said Ethernet network.

3. The method of claim 1 further comprising, in response to said sending one or more FMPs to said one or more Ethernet devices to discover said Ethernet network, initializing a temporary response timer by clearing a counter variable and starting the temporary response timer.

4. The method of claim 3 further comprising:
determining if said response timer has expired; and
in response to determining the response timer has expired, assigning one or more unused LIDs in said LID routing table to one or more Ethernet MAC addresses of one or more non-responding Ethernet devices of said one or more Ethernet devices.

5. The method of claim 1, wherein an entry corresponding to an Ethernet device that is LID mapped within the LID routing table includes a virtual InfiniBand LID, a corresponding IBOE port number, and a LID mapped MAC Address, wherein the LID Mapped MAC Address has a first set of bits containing the MAC Address assigned to InfiniBand LID mapped MAC addresses, a second set of bits that identify a subnet manager assigned LID, and one or more zero bits.

6. The method of claim 1, wherein an entry corresponding to an Ethernet device that is LID mapped within the LID routing table includes a placeholder value in place of an Ethernet MAC address.

7. The method of claim 1, wherein an entry corresponding to an Ethernet device that is not LID mapped within the LID routing table includes an Ethernet MAC address used in the IBOE Virtual HCA response management packet, a virtual InfiniBand LID, and an IBOE port number.

8. A computer network comprising:
an InfiniBand network;
an Ethernet network;
a subnet manager coupled to at least said InfiniBand network, wherein said subnet manager:
determines if a port of an InfiniBand over Ethernet (IBOE) gateway corresponds to one of one or more InfiniBand devices in said InfiniBand network or one or more Ethernet devices in said Ethernet network;
in response to a determination that the port of said IBOE gateway corresponds to one or more InfiniBand devices in said InfiniBand network:
sends one or more fabric management packets (FMPs) to said one or more InfiniBand devices to discover said InfiniBand network; and
assigns physical local identifiers (LIDs) to said one or more InfiniBand devices; and
in response to a determination that the port of said IBOE gateway corresponds to one or more Ethernet devices in said Ethernet network:
sends one or more FMPs to said one or more Ethernet devices to discover said Ethernet network;
receives a response from one or more responding Ethernet devices of said one or more Ethernet devices, wherein said response is an InfiniBand encapsulated IBOE Virtual HCA response management packet from a virtual HCA that contains an Ethernet Media Access Control (MAC) address of the virtual HCA;
adds one or more Ethernet MAC addresses of said one or more responding Ethernet devices to a LID routing table, wherein the LID routing table includes:
one or more Ethernet MAC addresses that correspond to said one or more Ethernet devices;
one or more InfiniBand LIDs that correspond to one or more physical HCAs, wherein physical HCAs in the LID routing table contain a zero in place of the MAC address;
one or more IBOE port numbers that correspond to ports of the IBOE gateway that one or more devices are coupled to;
one or more Ethernet MAC addresses matched to InfiniBand LIDs and IBOE port numbers; and
one or more LID mapping bits;
wherein virtual HCAs in the LID routing table contain a MAC address;
assigns one or more LIDs to said one or more Ethernet devices; and
configures one or more virtual HCAs corresponding to said one or more Ethernet MAC addresses in said LID routing table;
wherein said IBOE gateway includes said LID routing table.

9. The computer network of claim 8, wherein the IBOE gateway has a first port connected to said one or more InfiniBand devices in said InfiniBand network and a second port connected to said one or more Ethernet devices in said Ethernet network.

10. The computer network of claim 8, the subnet manager further: in response to said sending one or more FMPs to said one or more Ethernet devices to discover said Ethernet network, initializes a temporary response timer by clearing a counter variable and starting the temporary response timer.

11. The computer network of claim 10, the subnet manager further:
determines if said response timer has expired; and
in response to determining the response timer has expired, assigns one or more unused LIDs in said LID routing table to one or more Ethernet MAC addresses of one or more non-responding Ethernet devices of said one or more Ethernet devices.

12. The computer network of claim 8, wherein an entry corresponding to an Ethernet device that is LID mapped within the LID routing table includes a virtual InfiniBand LID, a corresponding IBOE port number, and a LID mapped MAC Address, wherein the LID Mapped MAC Address has a first set of bits containing the MAC Address assigned to InfiniBand LID mapped MAC addresses, a second set of bits that identify a subnet manager assigned LID, and one or more zero bits.

13. The computer network of claim 8, wherein an entry corresponding to an Ethernet device that is LID mapped within the LID routing table includes a placeholder value in place of an Ethernet MAC address.

14. The computer network of claim 8, wherein an entry corresponding to an Ethernet device that is not LID mapped within the LID routing table includes an Ethernet MAC address used in the IBOE Virtual HCA response management packet, a virtual InfiniBand LID, and an IBOE port number.

15. A computer program product comprising:
a recordable type computer storage device; and
program code on said recordable type computer storage device that when executed provides the functions of:
  determining if a port of an InfiniBand over Ethernet (IBOE) gateway corresponds to one of one or more InfiniBand devices in an InfiniBand network or one or more Ethernet devices in an Ethernet network;
  in response to a determination that the port of said IBOE gateway corresponds to one or more InfiniBand devices in an InfiniBand network:
    sending one or more fabric management packets (FMPs) to said one or more InfiniBand devices to discover said InfiniBand network; and
    assigning physical local identifiers (LIDs) to said one or more InfiniBand devices; and
  in response to a determination that the port of said IBOE gateway corresponds to one or more Ethernet devices in an Ethernet network:
    sending one or more FMPs to said one or more Ethernet devices to discover said Ethernet network;
    receiving a response from one or more responding Ethernet devices of said one or more Ethernet devices, wherein said response is an InfiniBand encapsulated IBOE Virtual HCA response management packet from a virtual HCA that contains an Ethernet Media Access Control (MAC) address of the virtual HCA;
    adding one or more Ethernet MAC addresses of said one or more responding Ethernet devices to a LID routing table wherein the LID routing table includes:
      one or more Ethernet MAC addresses that correspond to said one or more Ethernet devices;
      one or more InfiniBand LIDs that correspond to one or more physical HCAs, wherein physical HCAs in the LID routing table contain a zero in place of the MAC address;
      one or more IBOE port numbers that correspond to ports of the IBOE gateway that one or more devices are coupled to;
      one or more Ethernet MAC addresses matched to InfiniBand LIDs and IBOE port numbers; and
      one or more LID mapping bits;
      wherein virtual HCAs in the LID routing table contain a MAC address;
    assigning one or more LIDs to said one or more Ethernet devices; and
    configuring one or more virtual HCAs corresponding to said one or more Ethernet MAC addresses in said LID routing table;
    wherein said code for sending one or more FMPs to said one or more Ethernet devices to discover said Ethernet network discovers said Ethernet device in said Ethernet network and further comprises code for said IBOE gateway sending said one or more FMPs on behalf of a subnet manager coupled to said InfiniBand network to said one or more Ethernet devices in said Ethernet network.

16. The computer program product of claim 15, wherein the IBOE gateway has a first port connected to said one or more InfiniBand devices in said InfiniBand network and a second port connected to said one or more Ethernet devices in said Ethernet network.

17. The computer program product of claim 15, wherein said program code on said computer storage device, when executed, further provides the functions of: in response to said sending one or more FMPs to said one or more Ethernet devices to discover said Ethernet network, initializing a temporary response timer by clearing a counter variable and starting the temporary response timer.

18. The computer program product of claim 17, wherein said program code on said computer storage device, when executed, further provides the functions of:
  determining if said response timer has expired; and
  in response to determining the response timer has expired, assigning one or more unused LIDs in said LID routing table to one or more Ethernet MAC addresses of one or more non-responding Ethernet devices of said one or more Ethernet devices.

19. The computer program product of claim 15, wherein an entry corresponding to an Ethernet device that is LID mapped within the LID routing table includes a virtual InfiniBand LID, a corresponding IBOE port number, and a LID mapped MAC Address, wherein the LID Mapped MAC Address has a first set of bits containing the MAC Address assigned to InfiniBand LID mapped MAC addresses, a second set of bits that identify a subnet manager assigned LID, and one or more zero bits.

20. The computer program product of claim 15, wherein:
  an entry corresponding to an Ethernet device that is LID mapped within the LID routing table includes a placeholder value in place of an Ethernet MAC address; and
  an entry corresponding to an Ethernet device that is not LID mapped within the LID routing table includes an Ethernet MAC address used in the IBOE Virtual HCA response management packet, a virtual InfiniBand LID, and an IBOE port number.

* * * * *